United States Patent [19]

Kobel

[11] 4,254,965
[45] Mar. 10, 1981

[54] MOTORCYCLE SIDECAR APPARATUS
[76] Inventor: George B. Kobel, 10718 Sentinel, San Antonio, Tex. 78217
[21] Appl. No.: 34,473
[22] Filed: Apr. 30, 1979
[51] Int. Cl.³ .................................. B62R 27/12
[52] U.S. Cl. .................................. 280/203; 280/281 R
[58] Field of Search .................. 280/203, 281 R, 111, 280/112 A

[56] References Cited
U.S. PATENT DOCUMENTS

| 1,069,788 | 8/1913 | Johnson | 280/203 |
|---|---|---|---|
| 1,077,210 | 10/1913 | Alesani | 280/203 |
| 1,094,777 | 4/1914 | Buckland | 280/203 |
| 1,172,995 | 2/1916 | Honter | 280/203 |
| 1,204,924 | 11/1916 | Young | 280/203 |
| 1,235,177 | 7/1917 | Young | 280/203 |
| 2,702,196 | 2/1955 | Gamaunt | 280/203 |
| 3,941,405 | 3/1976 | Vetter | 280/203 |
| 3,948,335 | 4/1976 | Vetter | 280/203 |
| 4,022,483 | 5/1977 | Wallick et al. | 280/203 |
| 4,073,503 | 2/1978 | Hokans | 280/203 |

Primary Examiner—John J. Love
Assistant Examiner—Donn McGiehan
Attorney, Agent, or Firm—Cox & Smith Incorporated

[57] ABSTRACT

A motorcycle side car apparatus having a motorcycle support frame pivoted about the center line of the motorcycle wheels and about the center line of an outboard support wheel and a linkage means pivotally connected about the center line of the motorcycle wheels and about the center line of the support wheel for maintaining the side car support frame substantially level and the inclination of the support wheel at the same inclination of the motorcycle wheels and to distribute load forces at the center lines of the support wheel and the motorcycle wheels to avoid slippage and sliding of the wheels during turns.

7 Claims, 5 Drawing Figures

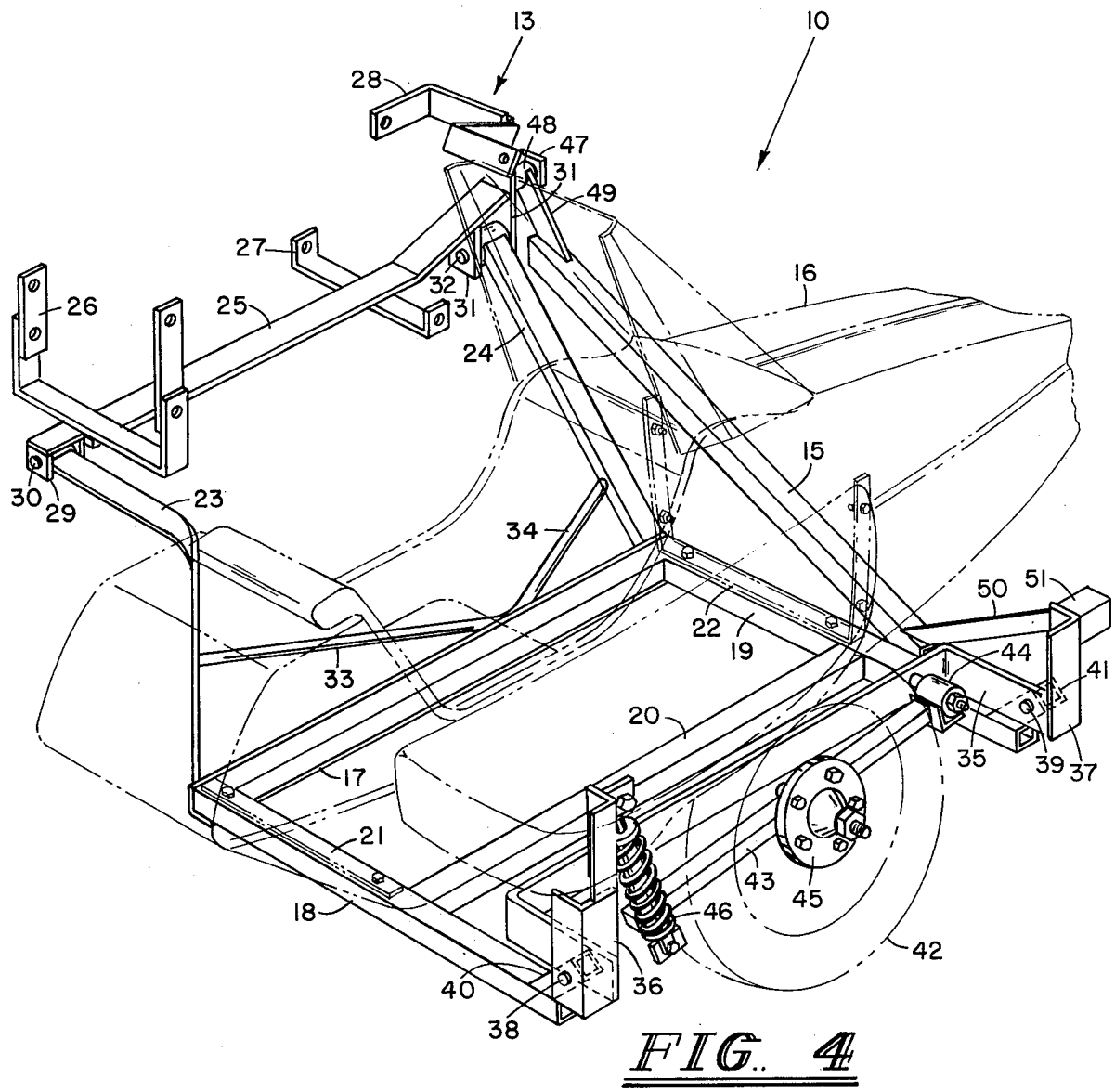
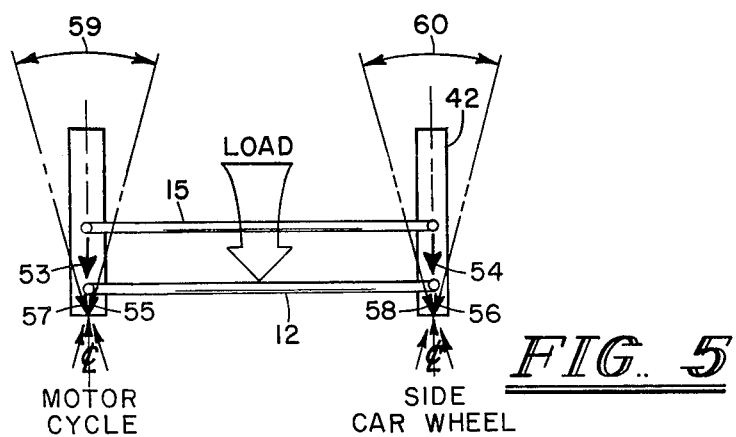

MOTORCYCLE SIDECAR APPARATUS

BACKGROUND OF THE INVENTION

This invention relates generally to a motorcycle sidecar apparatus. In particular, the invention relates to a particular linkage system of the sidecar and an attaching bracket for a motorcycle.

Numerous attempts have been made in the past to provide a linkage system for a motorcycle sidecar apparatus. Examples of such attempts are exemplified in U.S. Pat. Nos.: 1,069,788, 1,077,210, 1,094,777, 1,172,995, 1,204,924, 1,235,177, 2,702,196, 3,941,405, 3,948,335, 4,022,483, and 4,073,503.

As shown in the above listed patents, parallelogram linkages have been often used to maintain the sidecar wheel at the same inclination of the motorcycle wheels. Typically, the parallelogram linkages are attached to one side of the motorcycle with the support wheel for the sidecar secured at the outboard ends of the parallelogram linkage. U.S. Pat. No. 4,073,503 issued to David H. Hokans disclosed a motorcycle sidecar apparatus which does not include a parallelogram linkage but which is connected to the motorcycle along the center line of the motorcycle. U.S. Pat. No. 4,022,483 issued to Clarence H. Wallick et al discloses a parallelogram linkage which is apparently connected at pivot points along the center line of the motorcycle and along the center line of the support wheel. However, the support wheel is mounted inboard of the sidecar and the sidecar is maintained at the same inclination of the motorcycle.

A properly executed turn on a solo motorcycle, i.e. a motorcycle without a sidecar apparatus, requires that the rider lean in the direction of the turn. By so leaning, the motorcycle is inclined along a vector which is the resultant of the centrifugal force and weight acting on the motorcycle. Leaning, thus, transmits the forces in the plane of the center line of the motorcycle to avoid or minimize skidding or slipping of the motorcycle wheels during turns.

It is an object of this invention to provide a sidecar apparatus which distributes the weight of the sidecar on the motorcycle wheels and on the sidecar support wheel and which transmits the forces created during turning of the motorcycle in the planes of the motorcycle wheels and of the sidecar wheel. By so controlling and distributing the forces created by the sidecar, it is possible to avoid or minimize the skidding or slipping of the motorcycle wheels during turns. Even with the presence of the sidecar apparatus of the invention on a motorcycle, the motorcycle retains most of its characteristics for handling which a motorcycle without a sidecar would have. This provides a much safer vehicle and makes it possible to safely and efficiently utilize the sidecar on a motorcycle.

SUMMARY OF THE INVENTION

A new and improved motorcycle sidecar apparatus having and outboard wheel support means connected to a motorcycle through a parallelogram linkage system. The pivot points of the parallelogram linkage system lie along the center line of the motorcycle and along the center line of the support wheel means. This maintains the support wheel means at the same inclination as the motorcycle during turns and distributes forces created by the sidecar along the center lines of the wheels of the motorcycle and along a wheel on the wheel support means. The parallelogram linkage system includes a frame which supports a sidecar or the like and which maintains the sidecar substantially level during turns of the motorcycle. The support wheel is mounted on the wheel support means through a shock absorber which cushions the sidecar.

BRIEF DESCRIPTION OF THE DRAWINGS

FIG. 4 is a perspective view of the sidecar apparatus of this invention as viewed from the rear.

FIG. 5 is a schematic view showing the movement of the motorcycle wheels and the sidecar wheel with the respective vector forces indicated during turns of the motorcycle as viewed from the rear of the motorcycle and sidecar apparatus.

BRIEF DESCRIPTION OF THE PREFERRED EMBODIMENT

Figure 1:
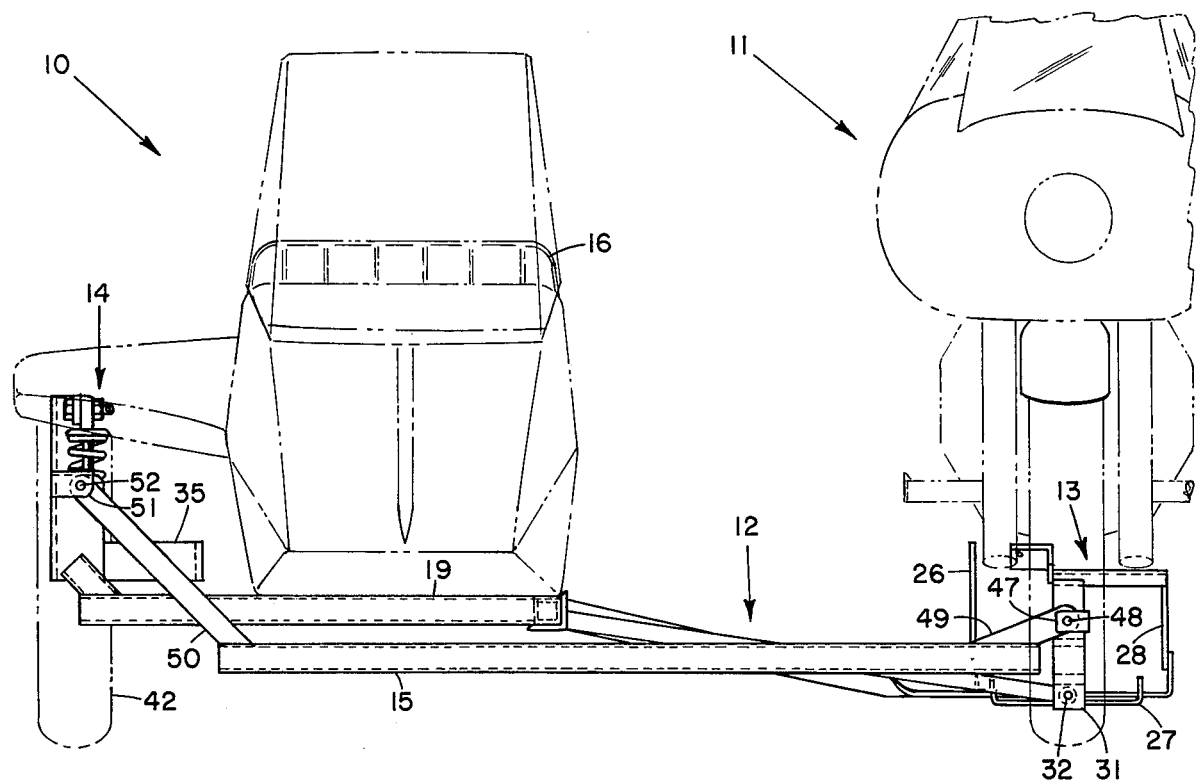
FIG. 1 is a front elevation view of the sidecar apparatus of this invention with the motorcycle to which it is to be attached on in broken lines and with the occupant support means which is attached to the sidecar apparatus also shown in broken lines.
Figure 2:
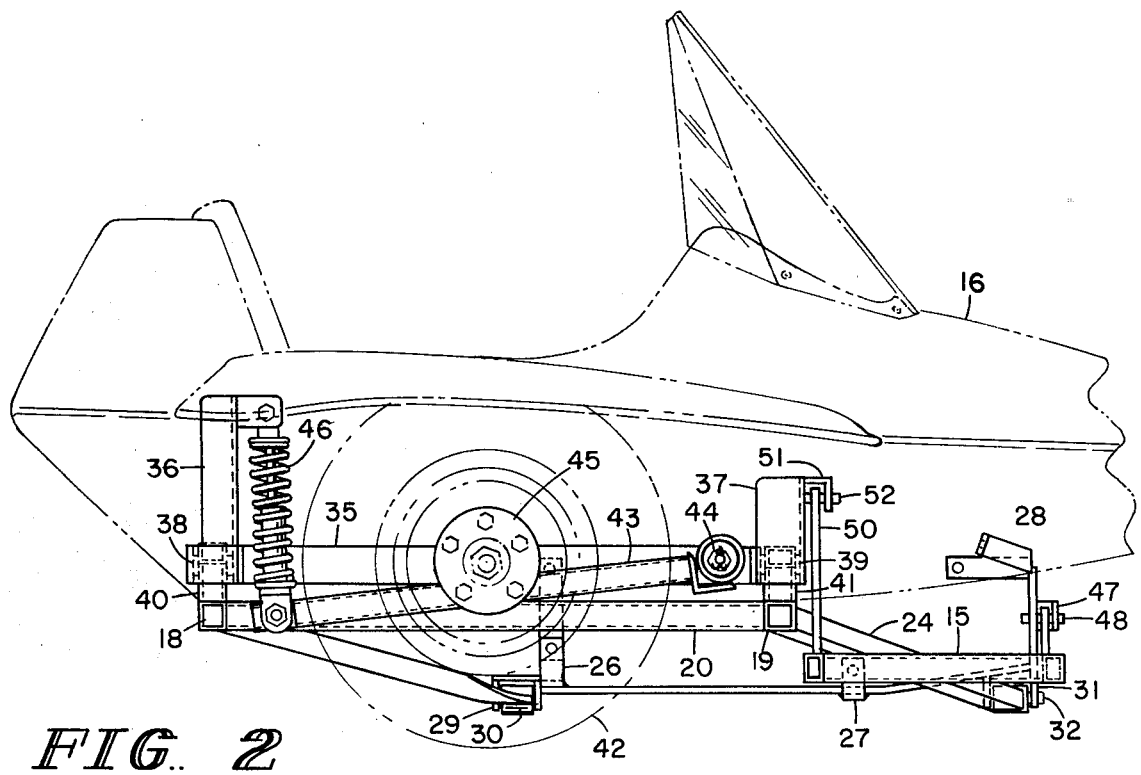
FIG. 2 is a side view of the sidecar apparatus of the invention.

Referring to FIG. 1 of the drawings, there is shown sidecar apparatus 10 attached to a motorcycle 11. The sidecar apparatus includes a sidecar support frame 12 which is pivotally connected to a motorcycle attaching bracket 13. The motorcycle attaching bracket 13 may take various forms as required for attaching to different type motorcycles. The sidecar support frame 12 is supported at its outboard end by wheel support means 14. The linkage means 15 is pivotally attached to the motorcycle attaching bracket and is also pivotally attached to the wheel support means 14. A suitable carrier means 16 is secured to the sidecar support frame 12 which in the form shown in FIG. 1 allows a passenger to be carried by the sidecar apparatus. It is understood that the carrier means may take various forms such as when it is desired to carry another passenger or is desired to carry freight, baggage or the like.

Figure 3:
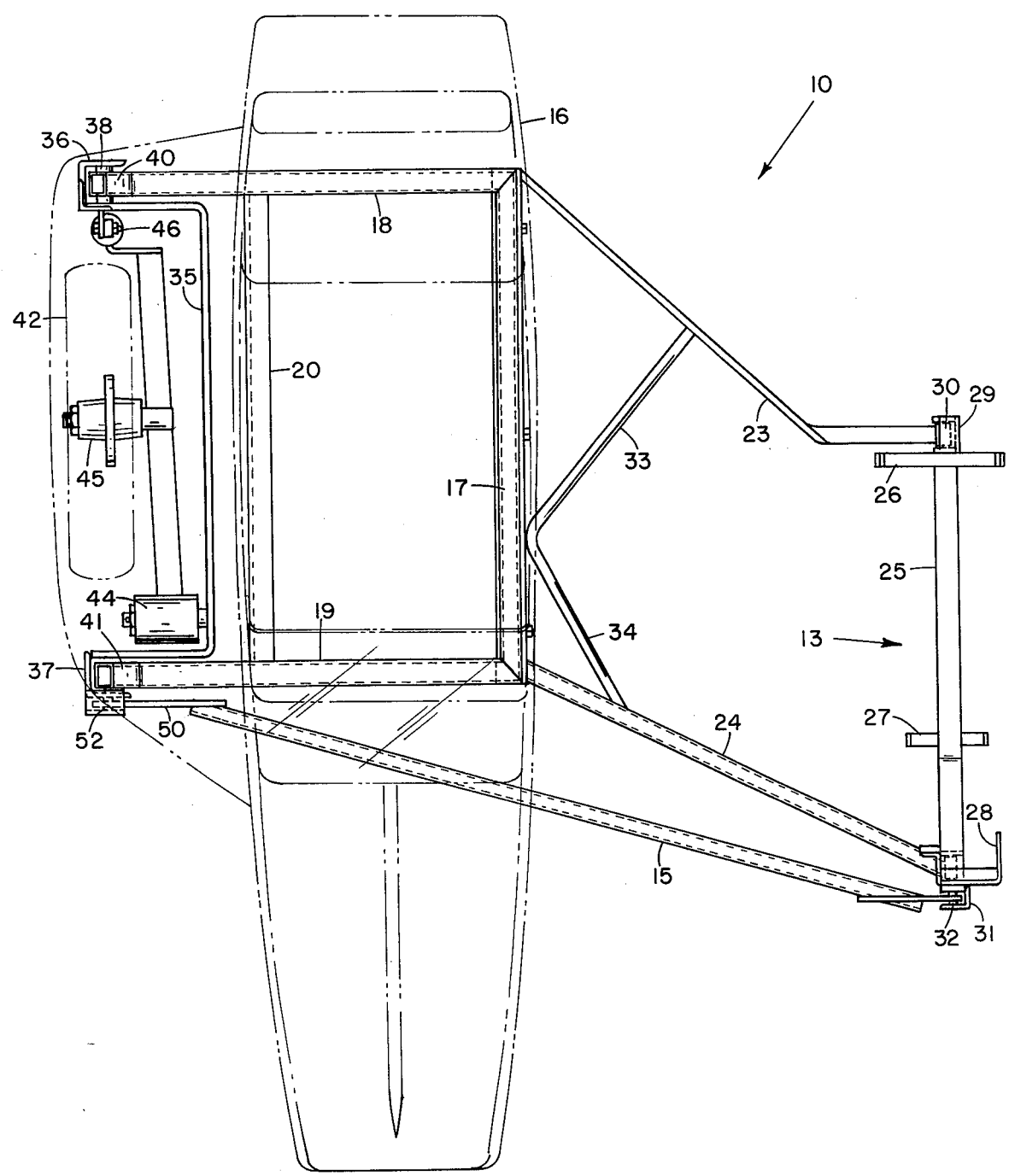
FIG. 3 is a top view of the sidecar apparatus of this invention.

The sidecar support frame 12 is shown more fully in FIGS. 3 and 4. It includes a generally rectangular frame formed by frame members 17, 18, 19 and 20. The frame members 17, 18, 19 and 20 allow the attachment of the carrier means 16 thereto through suitable attaching means 21 and 22. Links 23 and 24 are secured to the frame member 17 and extend inwardly for pivotally attaching to the motorcycle attaching bracket 13.

The motorcycle attaching bracket 13 includes a longitudinal extending member 25 to which is secured a plurality of brackets 26, 27 and 28 for securing to a motorcycle. The brackets 26, 27 and 28 may take various forms as required for securely attaching the motorcycle attaching bracket to a particular motorcycle. A first bifurcated bracket 29 is secured to the lower portion of the member 25 for pivotally mounting the link 23 about pivot pin 30. A second bifurcated bracket 31 is also secured to the lowermost portion of the member 25 at its forwardmost portion and includes a second pivot pin 32 for pivotally securing the link 24 to the motorcycle attaching bracket. As best shown in FIG. 1, the pivot points 30 and 32 lie along the center line of the motorcycle and below the center of the motorcycle wheels. Suitable brace members 33 and 34 are provided to reinforce the links 23 and 24.

The wheel support means 14 includes a generally U-shaped member 35 having uprights 36 and 37 secured at the ends of the U-shaped member 35. The frame member 18 is pivotally secured to the upright 36 and U-shaped member 35 about pivot pin 38. The frame member 19 is secured to the U-shaped member 35 and upright 37 by the pivot pin 39. Frame member 18 includes a pivot connecting member 40 which is pivotally secured to the pivot pin 38 and the frame member 19 includes a pivot connecting member 41 which is pivotally secured to the pivot pin 39. The pivot pins 38 and 39 as shown in FIG. 1 are preferably located at or slightly below the center of the support wheel 42.

A longitudinally extending arm member 43 is pivotally secured about journal means 44 to the U-shaped member 35. Accordingly, the longitudinally extending arm member 43 will pivot upwardly and downwardly in a vertical plane about the journal means 44. A suitable hub and spindle 45 is secured to the arm member 43 for mounting of the support wheel 42. Secured at the distal end of the arm member 43 is a combination shock absorber and support spring means 46 which is also connected to the upright 36. Accordingly, the support wheel 42 moves upwardly and downwardly relative to the U-shaped member 35 to lessen the amount of shocks and movement from road contours transmitted to the support frame 12.

The linkage means 15 is pivotally secured to the motorcycle support bracket through a pivot bracket 47 having a pivot pin 48. A pivot connecting member 49 is secured to the linkage means 15 for securing to the pivot pin 48. The distal end of the linkage means 15 includes a pivot connecting member 50 extending outwardly and upwardly at an angle to the linkage mans 15 for securing in the pivot connecting member 51 which is secured to the upright 37 about pivot pin 52. As it will be apparent, the pivot pins 48 and 52 are vertically spaced from the pivot pins 32 and 39 respectively. The use of the upwardly extending pivot connecting members 49 and 50 allow the location of the linkage means 15 below the frame members 17, 18, 19 and 20 as best shown in FIG. 1.

The operation of the sidecar apparatus of this invention can be clearly understood from schematic FIG. 5 which shows the movement of the motorcycle wheels along with the movement of the sidecar support wheel 42. The sidecar support frame 12 is illustrated schematically along with the linkage means 15. The load which is derived from the carrier means 16 rests generally on the sidecar support frame 12 as shown in FIG. 5. This results in vector forces represented by the arrows 53 and 54 which show the force on the motorcycle wheels and sidecar support wheel when the motorcycle and sidecar are travelling in a straight line. Should the motorcycle rider desire to execute a right turn, he will turn the motorcycle in the usual fashion to the right while at the same time leaning to the right which will result in a tilting of the motorcycle. The tilting of the motorcycle is transmitted to support wheel 42 so that the resulting vector forces are best illustrated by the arrows 55 and 56. The arrows 57 and 58 illustrate the results in vector forces which are applied to the motorcycle wheels and sidecar wheels when the motorcycle rider turns the motorcycle and sidecar to the left. The arrows 59 and 60 illustrate the tilting movement of the motorcycle wheels and sidecar wheels during turning of the motorcycle and sidecar apparatus.

By distributing the load through the resulting vectors 57 and 58 or 55 and 56 it is possible to substantially avoid any skidding or slipping of the motorcycle wheels or sidecar wheels since the resulting vector forces are along the center lines of the wheels in motorcycle. These vector forces are primarily applied to the pivot points which connect the sidecar support frame 12 to the motorcycle attaching bracket 13 and the wheel support means 14. Accordingly, the riding characteristics of the motorcycle are very similar to those when a sidecar is not attached to the motorcycle which allows the rider to maintain the stability of the motorcycle during the execution of turns. A rider in the carrier means 16 is maintained substantially level through the parallelogram linkage system which is formed by the sidecar support frame 12 and the linkage means 15. The position of the linkage means 15 below the carrier means and sidecar support frame 12 permits a passenger to be positioned substantially alongside the driver of the motorcycle while still providing a relatively compact sidecar apparatus.

While there has been shown an described a preferred embodiment of a motocycle sidecar apparatus in accordance with the invention, it will be appreciated that many changes and modifications may be made therein without, however, departing from the essential spirit of the invention within the scope of the claims.

I claim:

1. A motorcycle sidecar apparatus for attaching to a motorcycle, comprising:
    a motorcycle attaching bracket for securing to a motorcycle and having longitudinally spaced first pivot points located along the center line of the motorcycle wheels;
    a sidecars support frame pivotally secured at one side to the longitudinally spaced pivot points for pivoting of the support frame relative to the attaching bracket;
    an outboard wheel support means including a support wheel pivotally secured to the opposed other side of the support frame and having second pivot points located along the center line of the support wheel;
    a linkage means pivotally secured at one end to the motorcycle attaching bracket about a third pivot point located along the center line of the motorcycle wheels;
    said linkage means being pivotally secured at its other end to the wheel support means about a fourth pivot point located along the center line of the support wheel for maintaining the sidecar support frame substantially level and the inclination of the support wheel at the same inclination of the motorcycle wheels and to distribute load forces at the center lines of the support wheel and motorcycle wheels to avoid slippage and sliding of the wheels during turns.

2. The apparatus as set forth in claim 1, wherein:
    the support wheel is pivotally mounted with respect to the wheel support means for pivoting of the support wheel in a vertical plane in response to changes in the contour of the road.

3. The apparatus as set forth in claim 2, wherein:
    a shock absorbing means is provided to control the pivoting of the support wheel with respect to the wheel support means.

4. The apparatus as set forth in claim 1, wherein: the first and third pivot points are vertically spaced.

5. The apparatus as set forth in claim 1, wherein: the second and fourth pivot points are vertically spaced.

6. The apparatus as set forth in claims 1, 2, 3, 4 or 5 wherein: the first and second pivot points are located below the centers of the motorcycle wheels and the support wheel.

7. The apparatus as set forth in claims 1, 2, 3, 4 or 5 wherein: the third and fourth pivot axes are located at or below the centers of the motorcycle wheels and the support wheel.

* * * * *